United States Patent
Caceres et al.

(10) Patent No.: US 9,867,037 B2
(45) Date of Patent: Jan. 9, 2018

(54) PROFILE DELETION CODES IN SUBSCRIPTION MANAGEMENT SYSTEMS

(71) Applicant: Verizon Patent and Licensing Inc., Arlington, VA (US)

(72) Inventors: Manuel Enrique Caceres, Basking Ridge, NJ (US); Warren Hojilla Uy, Randolph, NJ (US); Nanjun Qian, Princeton, NJ (US); Axel Hallo De Wolf, Whippany, NJ (US); Ruben Cuadrat, New York, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/079,547

(22) Filed: Mar. 24, 2016

(65) Prior Publication Data
US 2017/0280320 A1 Sep. 28, 2017

(51) Int. Cl.
*H04W 8/24* (2009.01)
*H04W 8/18* (2009.01)
*H04W 12/04* (2009.01)

(52) U.S. Cl.
CPC ............ *H04W 8/24* (2013.01); *H04W 8/18* (2013.01); *H04W 12/04* (2013.01)

(58) Field of Classification Search
CPC ...... H04L 67/306; H04W 12/06; H04W 8/18; H04W 8/265
See application file for complete search history.

(56) References Cited

U.S. PATENT DOCUMENTS

| | | | |
|---|---|---|---|
| 2016/0105540 A1* | 4/2016 | Kwon | H04N 21/41407 715/747 |
| 2016/0157085 A1 | 6/2016 | Yeoum et al. | |
| 2016/0277930 A1 | 9/2016 | Li et al. | |
| 2016/0352698 A1* | 12/2016 | Long | H04W 4/003 |
| 2017/0034699 A1* | 2/2017 | Michel | H04W 12/06 |

* cited by examiner

*Primary Examiner* — Nam Huynh

(57) ABSTRACT

A mobile device, having a smart card within the mobile device, stores a Mobile Network Operator (MNO) profile for the mobile device in the smart card, where the MNO profile includes one or more network access credentials for accessing a wireless mobile network. The mobile device receives a customer request to delete the MNO profile, and sends, from the mobile device to a network node in the wireless mobile network, a request for profile deletion. The mobile device receives, responsive to the request from the network node, a deletion code; extracts, from the received deletion code, a deletion code signature and a public key of the network node. The mobile device validates the deletion code signature and the public key, and deletes, upon successful validation of the deletion code signature and the public key, the MNO profile from the smart card.

20 Claims, 9 Drawing Sheets

PROFILE DELETION CODES IN SUBSCRIPTION MANAGEMENT SYSTEMS

BACKGROUND

Smart cards typically consist of pocket-sized, or smaller, cards with embedded integrated circuits. Memory cards and microprocessor cards are two categories of smart cards. Memory cards contain only non-volatile memory storage components. Microprocessor cards contain memory storage components and microprocessor components. Microprocessor smart cards are typically used with mobile devices, such as cellular telephones, and have both limited memory capacity and processing power relative to the memory and microprocessor contained in the mobile devices into which the smart cards are inserted.

Subscriber Identity Module (SIM), Universal Integrated Circuit Cards (UICCs), and Removable User Identity Module (R-UIM) cards are examples of microprocessor smart cards. SIM cards securely store an identifier or key used to identify a subscriber on mobile telephone devices (e.g., cellular radiotelephones). SIM cards enable users to change phones by removing the SIM card from one telephony device and inserting it into another telephony device. UICCs are smart cards used in mobile terminals in Global System for Mobile Communications (GSM) and Universal Mobile Telecommunications System (UMTS) networks. UICCs ensure the integrity and security of different types of personal data, and may include several applications that permit access to both GSM and UMTS networks. R-UIMs include cards having features that are usable with Code Division Multiple Access (CDMA), GSM and UMTS devices.

Typical UICCs are pre-installed, during the manufacturing process, with Mobile Network Operator (MNO) profiles which include the applications (e.g., applets) and credentials (e.g., keys) necessary for the mobile devices, into which the UICCs are inserted, to attach to particular MNO network(s). The MNO profiles, in typical UICCs, remain installed in the UICCs for the life cycle of the UICCs, and usually cannot be changed or deleted.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

The GSM Association (GSMA), via its embedded UICC (eUICC) initiative, seeks to allow the download of MNO profiles into UICCs subsequent to manufacturing. Within the GSMA specifications for consumers, there is a component called the Local Profile Assistant (LPA) that may reside in the application processor or the modem/baseband radio processor of the mobile device. The LPA serves to assist in the download of profiles to the eUICC. Per the GSMA specifications, the LPA can command the eUICC to switch a MNO profile, disable a MNO profile, delete a MNO profile, and/or download a MNO profile. The ability to download and change a MNO profile is also relevant for machine-to-machine (M2M) devices, and wearable wireless devices. In these types of devices, the eUICC is soldered directly onto the circuit board, preventing removal. Therefore, the ability to download and change MNO profiles in eUICCs in M2M and wearable wireless devices would be advantageous.

One of the most sensitive operations that the LPA can perform on the eUICC is MNO profile deletion. Since the MNO profile contains the necessary credentials to attach to the MNO network, if the MNO profile is deleted, an immediate denial of service will result. Deletion of the MNO profile would require the user to re-download the MNO profile. However, if the user does not have a network connection available to do this, then the denial of service will be catastrophic.

Since the LPA resides either in the application processor, or the modem/baseband radio processor, the security of the profile deletion command relies on the security controls in this environment. The application processor, however, is considered a hostile environment since the application processor is susceptible to "zero day" attacks, and also because the user may download malware. For example, downloaded malware can bypass the LPA, and send comments directly to the eUICC instructing the eUICC to delete the stored MNO profile. If this type of malware were to affect thousands of customers in a distributed manner, there is nothing that the MNO could do to stop it and denial of service to the customers could happen on a large scale.

Exemplary embodiments described herein propose a system that both captures user intent to delete a MNO profile, and ensures that the MNO carrier can protect the customer from malware deletion of their MNO profiles. The system described herein includes a decentralized approach that enables any GSMA-certified carrier to issue profile deletion. Therefore, the system described herein alleviates issues related to government regulations that require that hardware not be locked down to a specific carrier.

Figure 1:
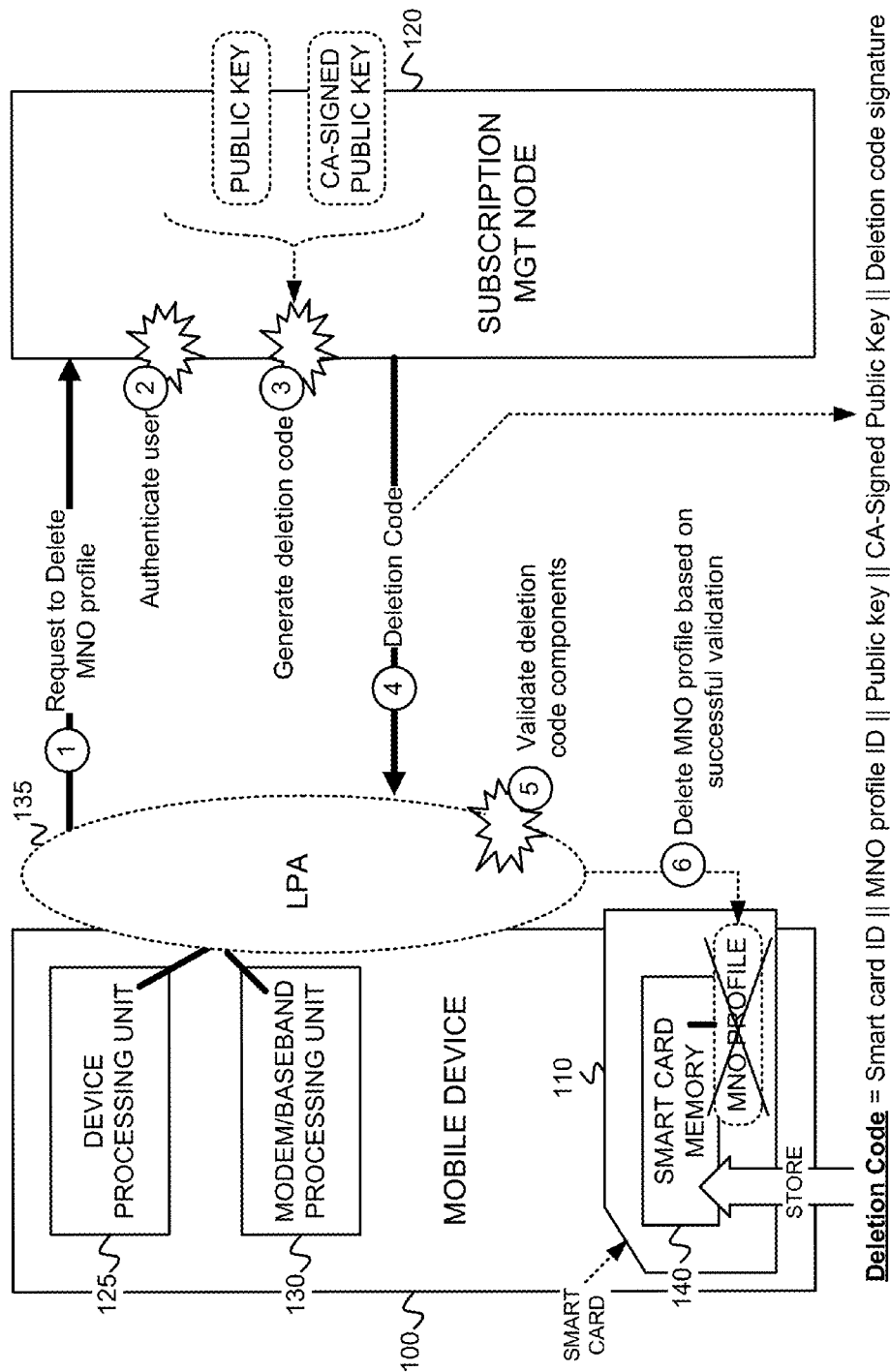
FIG. 1 is a diagram that depicts an overview of the delivery of a deletion code to a mobile device, validation of components of the delivered deletion code, and deletion of an MNO profile from a smart card at the mobile device based on results of the validation of the delivered deletion code.

FIG. 1 is a diagram that depicts an overview of the delivery of a deletion code to a mobile device, validation of components of the delivered deletion code, and deletion of an MNO profile from a smart card at the mobile device based on results of the validation of the delivered deletion code. As shown in FIG. 1, a mobile device 100 may have a smart card 110 within mobile device 100 (i.e., interconnected with a smart card interface to connect to an internal system bus of the mobile device 100). A Local Profile Assistant (LPA) 135 may be executed by device processing unit 125 or by modem/baseband processing unit 130 of mobile device 100. In some implementations, LPA 135 may be executed by a processing unit (not shown) of smart card 110. LPA 135 includes one or more applications, resident in memory within mobile device 100 or within a smart card memory 140 of smart card 110, that assists in the download of MNO profiles to smart card 110, requests deletion codes from a subscription management (mgt) node 120, and causes a current MNO profile stored in smart card memory 140 of smart card 110 to be deleted based on a deletion code received from subscription mgt node 120. LPA 135 additionally includes functionality for implementing a Local User Interface (LUI) and a Local Profile Download (LPD). Subscription mgt node 120, as described further below with respect to FIG. 2, may include a network node in an external network, such as, for example, a MNO Public Land Mobile Network (PLMN) that performs, among other functions, subscription management functions related to subscribers of the MNO PLMN. In the exemplary implementation shown in FIG. 1, one of the subscription management functions performed by subscription mgt node 120 may include customer/user authentication, and deletion code generation and issuance. As part of performing its subscription management functions, subscription mgt node 120 may obtain an asymmetric encryption key pair (e.g., a public/private key pair), generated using existing asymmetric encryption key generation techniques, and may, via Public Key Infrastructure (PKI) mechanisms, obtain a PKI certificate and a Certificate Authority (CA)-signed version of the public key from a PKI CA.

As depicted in FIG. 1, LPA 135 may send a request (identified with a "1" within a circle) to delete the MNO profile from smart card 110, to subscription mgt node 120. The request may originate from LPA 135 based on intent of the customer/user 115 (FIG. 2) of mobile device 100 to delete the MNO profile. LPA 135 may determine the intent of the customer 115, for example, based on explicit manually entered user input into mobile device 100 requesting deletion of the MNO profile stored in smart card 110. A request to delete a current MNO profile may, for example, occur when a current MNO profile is to be updated and/or replaced with a new/another MNO profile. Upon receipt of the request to delete the MNO profile, subscription mgt node 120 may authenticate (identified with a "2" within a circle) the customer/user 115 of mobile device 100 and, if the authentication is successful, may generate (identified with a "3" within a circle) a deletion code. Various different existing techniques may be used to authenticate the customer/user 115 of mobile device 100. A "deletion code," as referred to herein, includes a string of data that further includes multiple components concatenated together to create a single block of data, with the multiple components of the string of data being used, at LPA 135, as a basis for determining whether the MNO profile should be deleted. Examples of the multiple components of the deletion code are described in further detail below.

Upon successful authentication of the customer/user of mobile device 100, subscription mgt node 120 generates the deletion code. In one exemplary implementation, as shown in FIG. 1, the deletion code may be generated by concatenating a smart card identifier (ID) associated with smart card 110, an MNO profile ID associated with the MNO profile to be deleted, the public key of subscription mgt node 120, the CA-signed public key received from the PKI CA, and a deletion code signature value. The deletion code signature value may be generated by taking a digital signature, using a private key of a public/private key pair, of multiple components of the deletion code. In one example, the deletion code signature may be generated by taking a signature over the data string that includes the smart card ID, the MNO profile ID, the public key, and the CA-signed public key all concatenated together. The resulting generated deletion code signature may be appended to the other components of the data string of the deletion code to produce the entire data string of the deletion code. Subscription mgt node 120 may issue (identified with a "4" within a circle) the generated deletion code to LPA 135 of mobile device 100.

Upon receipt of the issued deletion code, LPA 135 may extract various ones of the components of the deletion code, and may validate the various components. For example, LPA 135 may extract the public key of subscription mgt node 120, the CA-signed public key, the deletion code signature, the smart card ID and the MNO profile ID. LPA 135 may validate (identified with a "5" within a circle) the public key, and the deletion code signature. LPA 135 may further validate the smart card ID and/or the MNO profile ID. LPA 135 may cause the MNO profile to be deleted from smart card memory 140 of smart card 110 if the components of the issued deletion code are successfully validated. Subsequent to, or prior to, deletion of the MNO profile from smart card 110, LPA 135 may, for example, download an updated or new MNO profile, and may cause the updated or new MNO profile to be stored in memory 140 of smart card 110. As shown in FIG. 1, once LPA 135 has validated the components of the deletion code, LPA 135 may cause the deletion code to be stored in smart card memory 140 for future use such as, for example, for deleting one or more subsequent, new or updated MNO profiles stored in smart card memory 140.

Figure 2:
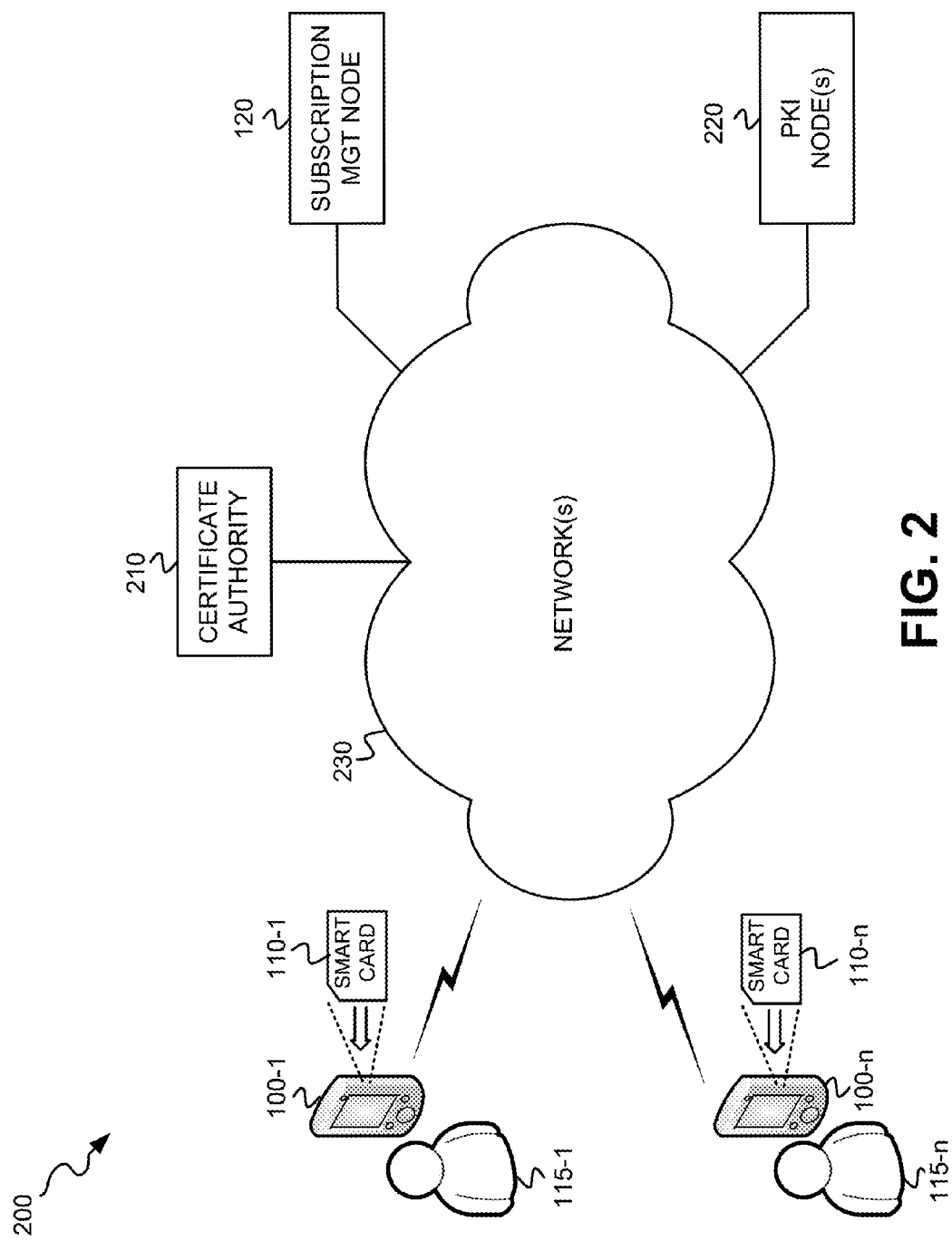
FIG. 2 is a diagram that depicts an exemplary network environment in which deletion codes are delivered to mobile devices for the purpose of enabling the deletion of MNO profiles from the smart cards at the mobile devices.

FIG. 2 is a diagram that depicts an exemplary network environment 200 in which deletion codes are delivered to mobile devices for the purpose of enabling the deletion of MNO profiles from the smart cards at the mobile devices. Network environment 200 includes mobile devices 100-1 through 100-*n*, where n is greater than or equal to one (generically referred to herein as "mobile device 100" or "mobile devices 100"), PKI certificate authority 210 (referred to herein as "certificate authority 210," "CA 210," or "CA"), subscription management (MGT) node 120, PKI node(s) 220, and network(s) 230.

Mobile devices 100 each include an electronic device that further includes an interface for receiving and interconnecting with a respective one of microprocessor smart cards 110-1 through 110-*n* (generically referred to herein as "smart card 110" or "smart cards 110"), and which also includes a wireless interface for communicating via network(s) 230. Mobile device 100 may include, for example, a cellular radiotelephone, a smart phone, a personal digital assistant (PDA), a wearable computer, a palmtop or tablet computer, or a media player. Mobile device 100 may, however, include any type of electronic device that may include a smart card 110 and a wireless communication interface.

Microprocessor smart card 110 includes any type of microprocessor smart card capable of being interconnected with mobile device 100 (e.g., inserted into mobile device 100). Smart card 110 may, for example, include a small microprocessor smart card embedded with a memory storage component(s) and a microprocessor component(s). Smart card 110 may include a Subscriber Identity Module (SIM), a Universal Integrated Circuit Card (UICC), or a Removable User Identity Module (R-UIM) card which store an MNO profile, in addition to other applications and/or data. SIM cards securely store an identifier (e.g., a Mobile Directory Number (MDN)) and/or key used to identify a subscriber on mobile telephone devices (e.g., cellular radiotelephones). Other types of microprocessor smart cards, not described herein, may be used for smart card 110.

Certificate authority 210 includes one or more network devices that act as a node in a Public Key Infrastructure (PKI) system for generating and issuing a digital identity certificate requested by a mobile device 100, and for signing a public key of subscription mgt node 120 and issuing a CA-signed version of the public key to subscription mgt node 120.

Subscription mgt node 120 includes one or more network devices that, based on receipt of a request to delete an MNO profile at a mobile device 100, authenticate a customer/user of the mobile device 100, and generate and issue a deletion code, as described further herein, based on successful authentication of the customer/user. In one exemplary implementation, subscription mgt node 120 may include the Subscription Manager-Data Preparation (SM-DP) node of a Public Land Mobile Network (PLMN).

PKI node(s) 220 includes one or more other nodes of the PKI system that, in conjunction with certificate authority 210, bind user public keys with respective user identities and assist in the creation, management, distribution, storage and revocation of digital identity certificates. PKI node(s) 220 may include, for example, a registration authority (RA) that verifies the identity of customers/users requesting information from the certificate authority.

Network(s) 230 includes one or more networks of any type, such as, for example, a telecommunications network (e.g., a Public Switched Telephone Network (PSTN)), a local area network (LAN), a wide area network (WAN), a metropolitan area network (MAN), an intranet, the Internet, a wireless satellite network, a cable network (e.g., an optical cable network), and/or one or more wireless public land mobile networks (PLMNs). The PLMN(s) may include a Code Division Multiple Access (CDMA) 2000 PLMN, a GSM PLMN, a Long Term Evolution (LTE) PLMN and/or other types of PLMNs not specifically described herein. In one implementation, network(s) 230 may include a PLMN connected to one or more other networks (e.g., the Internet). For example, in this implementation, subscription mgt node 120 may include a network device resident in the PLMN.

The configuration of the components of network environment 200 depicted in FIG. 2 is for illustrative purposes only. It should be understood that other configurations may be implemented. Therefore, network environment 200 may include additional, fewer and/or different components, that may be configured differently, than depicted in FIG. 2.

Figure 3:
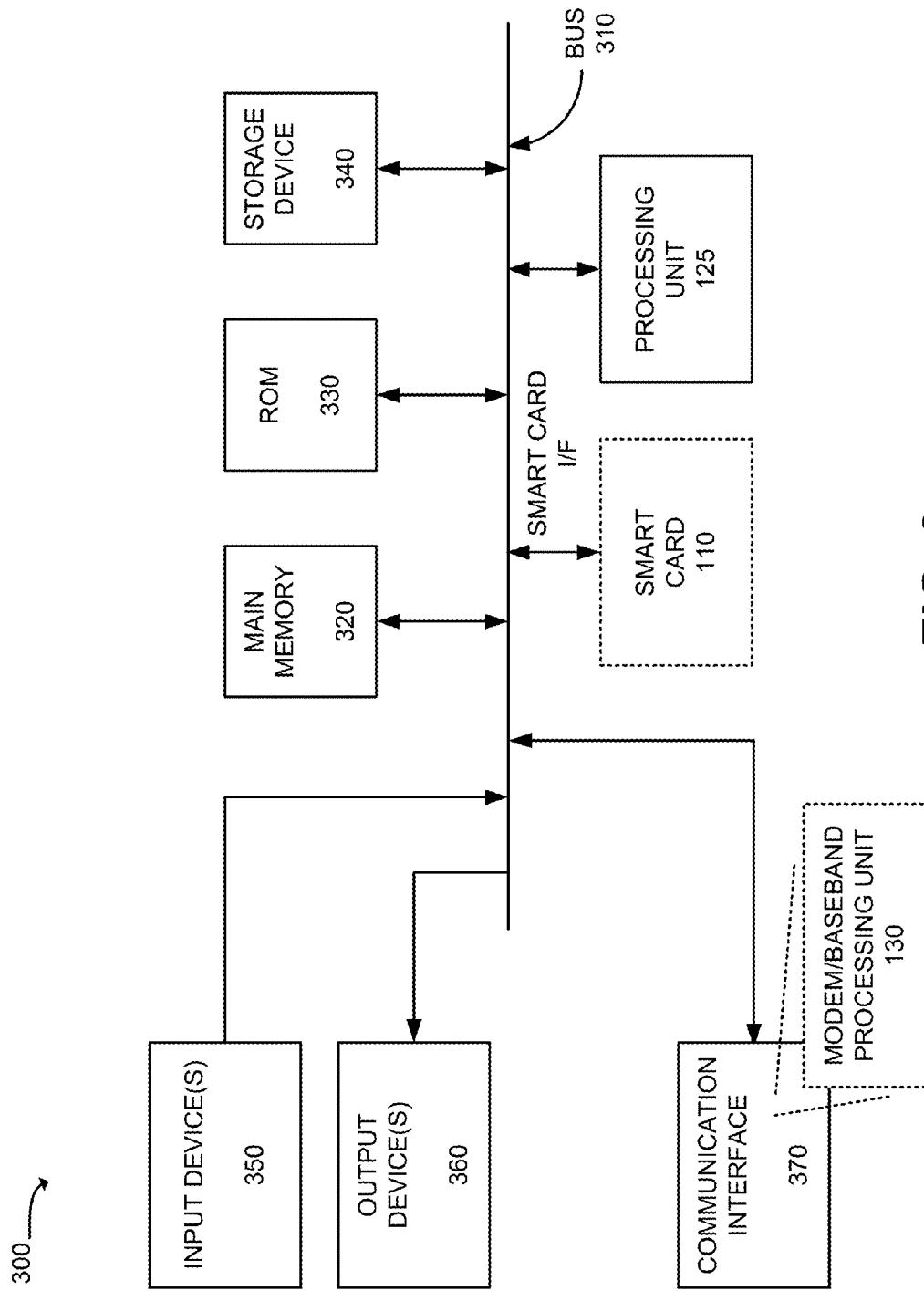
FIG. 3 is a diagram of exemplary components of a device that may correspond to the mobile devices, the certificate authority, the subscription management node, and the Public Key Infrastructure node(s) of FIG. 2.

FIG. 3 is a diagram of exemplary components of a device 300. Mobile devices 100, certificate authority 210, subscription mgt node 120, and PKI node(s) 220 may each include the same, or similar components, in a same or similar configuration to that depicted in FIG. 3. Device 300 may include a bus 310, a processing unit 125, a main memory 320, a read only memory (ROM) 330, a storage device 340, an input device(s) 350, an output device(s) 360, and a communication interface 370. Bus 310 may include a path that permits communication among the elements of device 300. As further shown in FIG. 3, in the case of device 300 being mobile device 100, smart card 110 may be interconnected with a smart card interface (I/F) of mobile device 100 that further connects to bus 310. As also shown in FIG. 3, in the case of device 300 being mobile device 100, communication interface 370 may include a modem/baseband processing unit 130. Modem/baseband processing unit 130 includes a device (e.g., a chip or portion of a chip) that manages wireless communication functions such as, for example, radio functions that involve communication via an antenna. Modem/baseband processing unit 130 may, in one implementation, include its own memory and firmware.

Processing unit 125 may include a processor, microprocessor, or processing logic that may interpret and execute instructions. Main memory 320 may include a random access memory (RAM) or another type of dynamic storage device that may store information and instructions for execution by processing unit 125. ROM 330 may include a ROM device or another type of static storage device that may store static information and instructions for use by processing unit 125. Storage device 340 may include a magnetic and/or optical recording medium and its corresponding drive. Main memory 320, ROM 330 and storage device 340 may each be referred to herein as a "tangible non-transitory computer-readable medium."

Input device 350 may include one or more mechanisms that permit a user or operator to input information to device 300, such as, for example, a keypad or a keyboard, a display with a touch sensitive panel, voice recognition and/or biometric mechanisms, etc. Output device 360 may include one or more mechanisms that output information to the operator or user, including a display, a speaker, etc. Input device 350 and output device 360 may, in some implementations, be implemented as a graphical user interface (GUI) that displays GUI information and which receives user input via the GUI. Communication interface(s) 370 may include one or more transceivers that enable device 300 to communicate with other devices and/or systems. For example, communication interface(s) 370 may include wired and/or wireless transceivers for communicating via network(s) 230. If device 300 is a mobile device 100, then communication interface(s) 370 includes a wireless transceiver (including one or more antennas) for communicating via a PLMN using modem/baseband processing unit 130.

Device 300 may perform certain operations or processes, as may be described in detail below. Device 300 may perform these operations in response to processing unit 125 executing software instructions contained in a computer-readable medium, such as memory 320. A computer-readable medium may be defined as a physical or logical memory device. A logical memory device may include memory space within a single physical memory device or spread across multiple physical memory devices. The software instructions may be read into main memory 320 from another computer-readable medium, such as storage device 340, or from another device via communication interface 370. The software instructions contained in main memory 320 may cause processing unit 125 to perform operations or processes that will be described later. Alternatively, hard-wired circuitry may be used in place of or in combination with software instructions to implement processes described herein. Thus, exemplary implementations are not limited to any specific combination of hardware circuitry and software.

The configuration of components of device 300 illustrated in FIG. 3 is for illustrative purposes only. It should be understood that other configurations may be implemented. Therefore, device 300 may include additional, fewer and/or different components, arranged in a different configuration, than depicted in FIG. 3.

Figure 4:
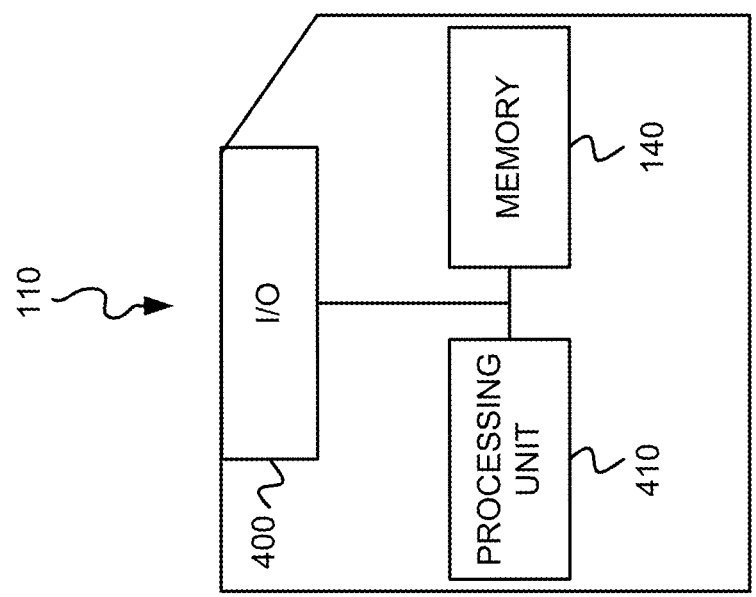
FIG. 4 is a diagram that depicts exemplary components of a smart card of FIGS. 1 and 2.

FIG. 4 is a diagram that depicts exemplary components of smart card 110. Smart card 110 may include input/output circuitry 400, a processing unit 410, and a memory 140. Input/output circuitry 400 may include circuitry for inputting data to smart card 110 from mobile device 100 (e.g., via bus 310), and output circuitry for outputting data from smart card 110 to mobile device 100 (e.g., via bus 310). Processing unit 410 may include a processor, microprocessor, or processing logic that may interpret and execute instructions. Memory 140 may include RAM, ROM, and/or Electrically Erasable Programmable Read-Only Memory (EEPROM) that may store data, and may store instructions for execution by processing unit 410.

Smart card 110 may perform certain operations or processes. Smart card 110 may perform these operations in response to processing unit 410 executing software instructions contained in a non-transitory computer-readable storage medium, such as memory 140. The configuration of components of smart card 110 illustrated in FIG. 4 is for illustrative purposes only. It should be understood that other configurations may be implemented. Therefore, smart card 110 may include additional, fewer and/or different components, arranged in a different configuration, than depicted in FIG. 4.

Figure 5:
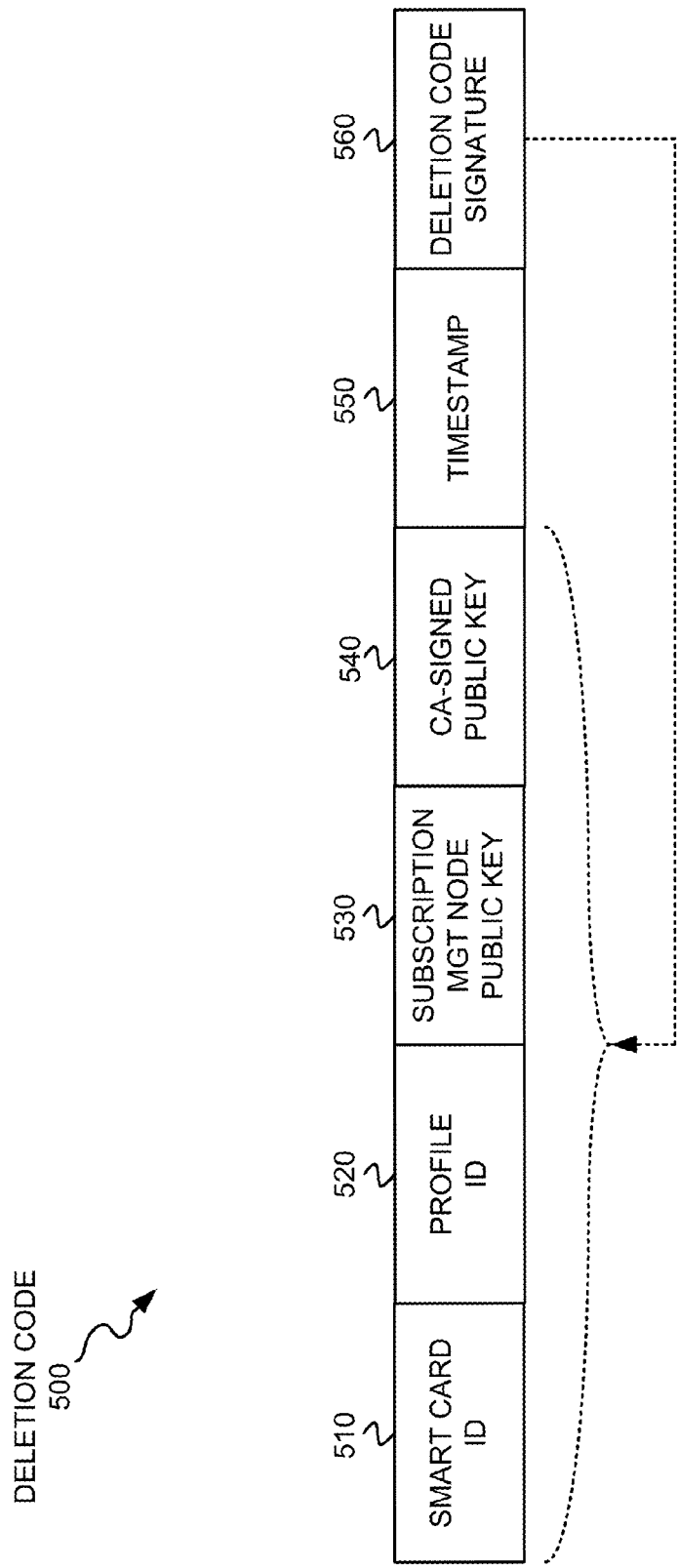
FIG. 5 depicts exemplary components of a profile deletion code that may be generated by the subscription management node of FIG. 2.

FIG. 5 depicts exemplary components of a profile deletion code 500 (referred to herein as "deletion code 500") that may be generated by subscription mgt node 120. Deletion code 500 may include a string of data whose concatenated components or data include smart card identifier (ID) data 510, profile ID data 520, a subscription mgt node public key 530, a certificate authority-signed public key 540, timestamp data 550, and a deletion code signature 560. The component data 510-560 may each be encoded using various different types of encoding schemes. In one implementation, each component 510-560 of deletion code 500 may be encoded using Type-Length-Value (TLV) encoding.

Smart card ID data 510 includes data that uniquely identifies a smart card 110 in which the MNO profile is stored that is to be deleted based on deletion code 500. In one exemplary implementation, smart card ID data 510 may include data that identifies the eUICC ID (EID) of smart card 110. Profile ID data 520 includes data that uniquely identifies the MNO profile that is to be deleted based on deletion code 500. In one exemplary implementation, profile ID data 520 includes a unique number (e.g., the Integrated Circuit Card ID (ICCID)) that identifies the operational MNO profile in a eUICC.

Subscription mgt node public key 530 includes a public key of subscription mgt node 120, where the public key is part of a public/private asymmetric encryption key pair obtained by subscription mgt node 120. CA-signed public key 540 includes a version of the public key of subscription mgt node public key data 530 that has been signed by certificate authority 210 of the PKI system.

Timestamp data 550 includes data that identifies a current time at which deletion code 500 is generated and issued to a LPA 135 of a mobile device 100. The current time may, for example, include a Universal Time, Coordinated (UTC). Timestamp data 550 may be optional such that, in some implementations, timestamp data 550 is not included within deletion code 500.

Deletion code signature 560 includes a digital signature applied, using the subscription mgt node 120's private key of the public/private key pair and a signature generation algorithm, over multiple components of deletion code 500. In one implementation, the digital signature may be applied or executed, using the private key, over data 510, 520, 530, and 540 (and, optionally, timestamp 550) of deletion code 500. Upon generation of the digital signature, the digital signature may be appended, as data 560, to deletion code 500.

The data contents of deletion code 500, shown in FIG. 5, are for illustrative purposes. Deletion code 500 may include a different number, type, or content of data of the various components of the string of data, and/or may be arranged in a different order, than that shown in FIG. 5.

Figure 6A:
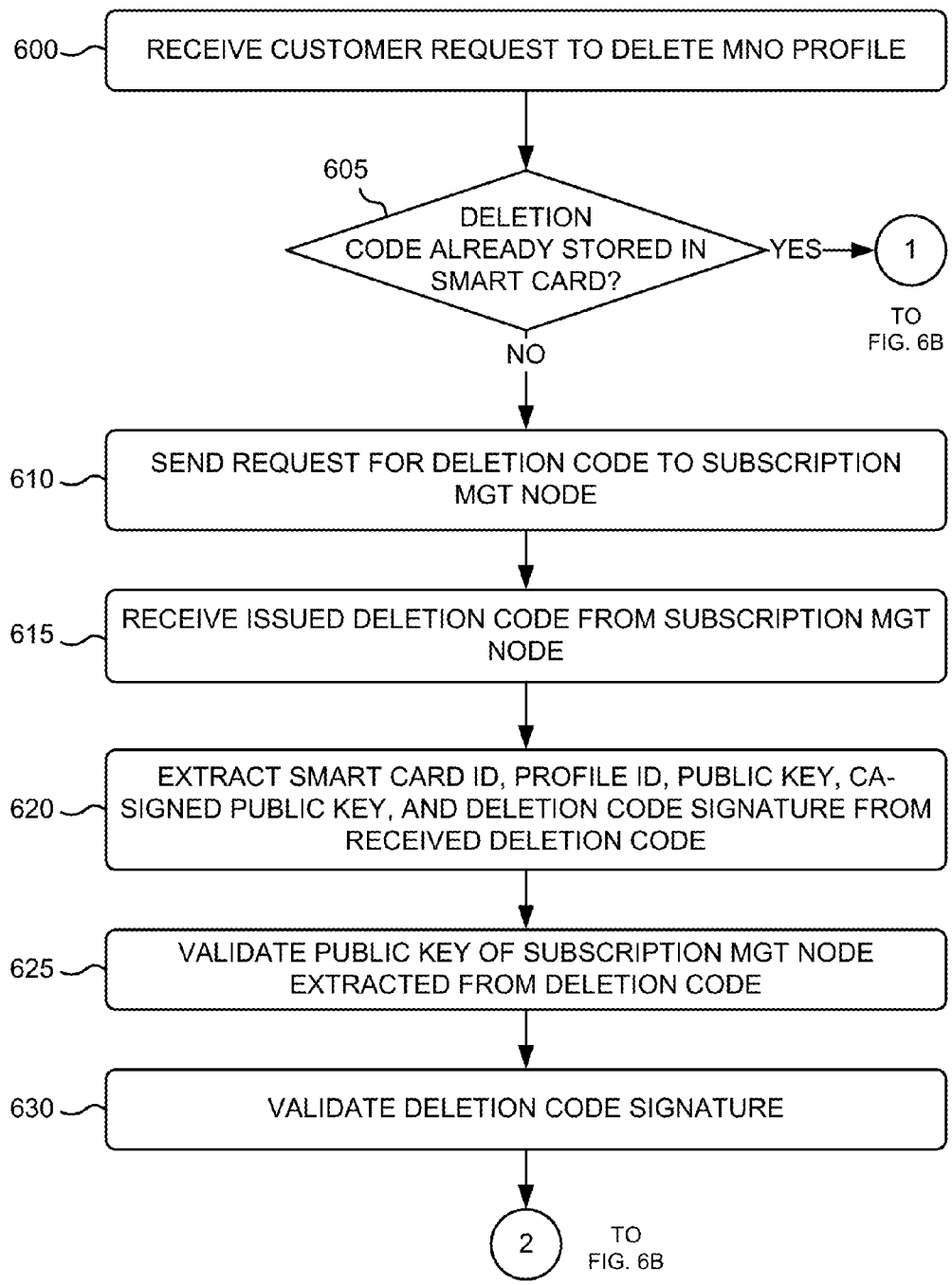
FIGS. 6A and 6B are flow diagrams illustrating an exemplary process for obtaining a profile deletion code to enable a MNO profile to be deleted at a mobile device.
Figure 6B:
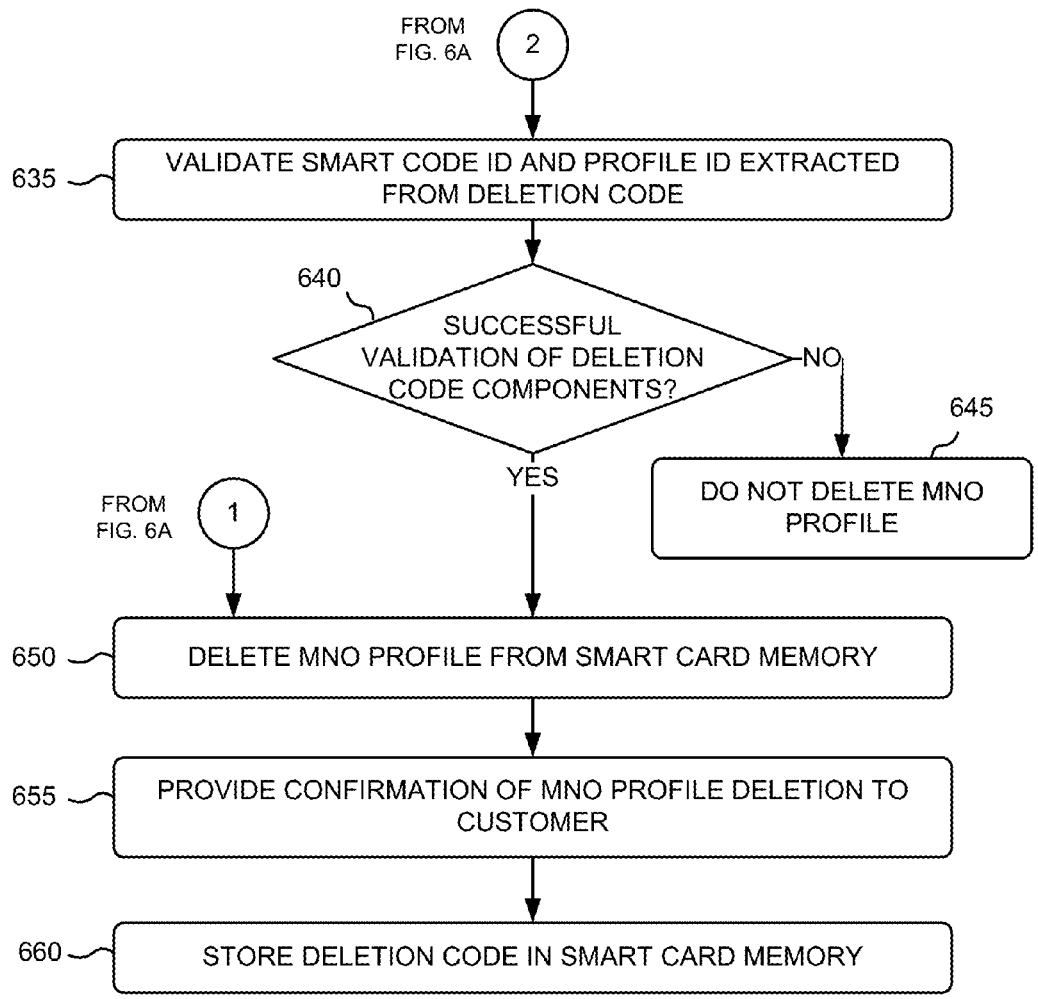

FIGS. 6A and 6B are flow diagrams illustrating an exemplary process for obtaining a profile deletion code to enable a MNO profile to be deleted at a mobile device 100. The exemplary process of FIGS. 6A and 6B may be implemented by processing unit 125 of mobile device 100, in conjunction with processing unit 410 of smart card 110. The exemplary process of FIGS. 6A and 6B is described with reference to the exemplary messaging diagram of FIG. 7.

Figure 7:
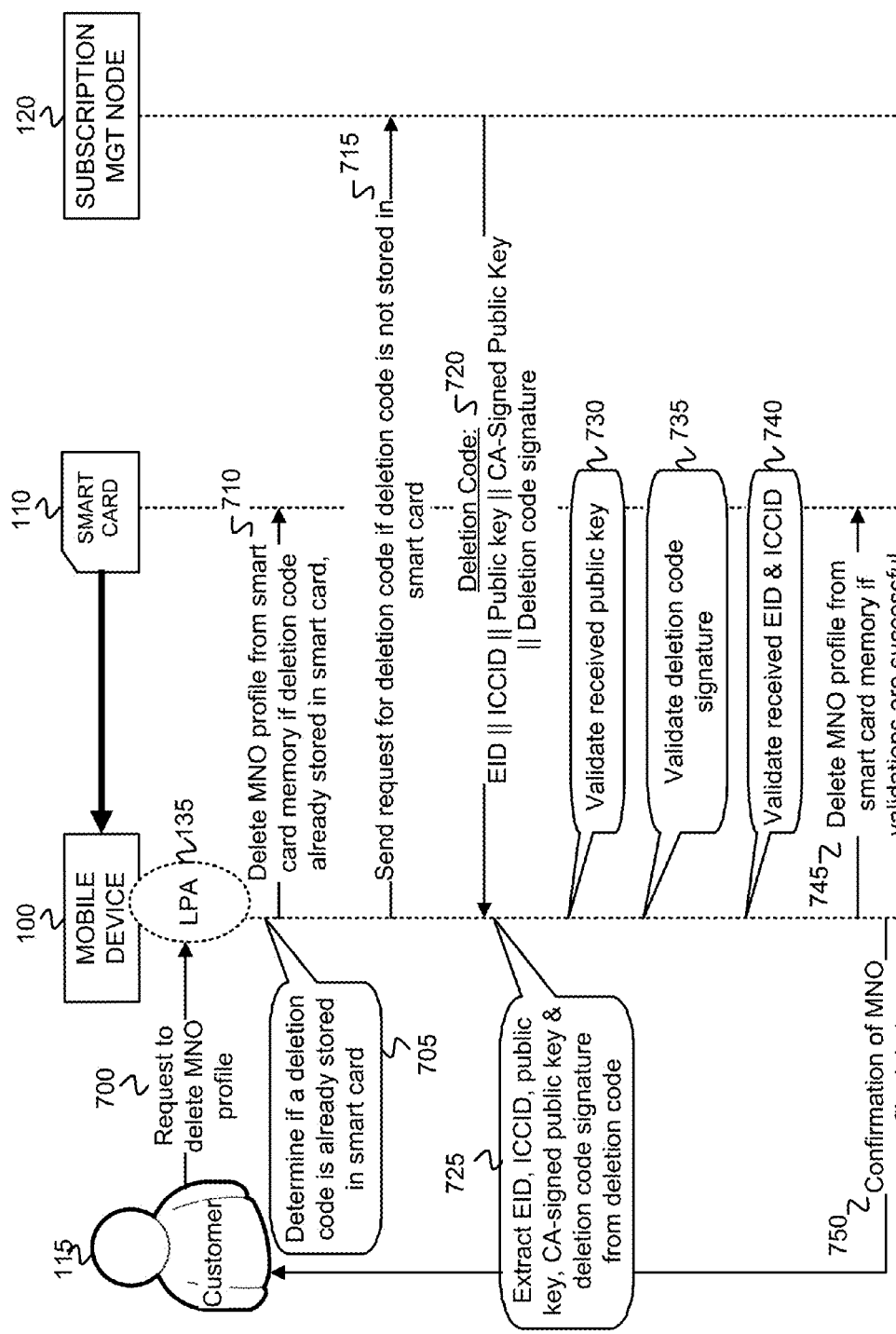
FIG. 7 is a messaging diagram associated with the exemplary process of FIGS. 6A and 6B.

The exemplary process includes receiving, at mobile device 100, a customer request to delete the customer's MNO profile from storage at mobile device 100 (block 600). The customer/user may wish to download a new or updated MNO profile and may provide input into mobile device 100 requesting deletion of the current MNO profile. The customer/user may, for example, apply user input via a touch screen display of input device(s) 350 of mobile device 100 that requests, either explicitly or implicitly, deletion of the current MNO profile. As an example, if the customer/user of mobile device 100 requests the download of a new MNO profile, then the current MNO profile must first be deleted so that the request to download the new MNO profile is taken as an implicit request by the customer/user to delete the current MNO profile. FIG. 7 depicts customer 115 providing a request 700 to delete the current MNO profile to mobile device 100.

LPA 135 at mobile device 100 determines if a deletion code is already stored in smart card 110 (block 605). Upon receipt of the request to delete the current MNO profile, LPA 135 sends an inquiry to smart card 110 requesting whether there already is a deletion code stored in smart card memory 140 of smart card 110. For example, a deletion code may have been delivered to smart card 110 by the manufacturer and stored in smart card memory 140. As another example, the customer/user of mobile device 100 may have used a camera of mobile device 100 to scan a Quick Response (QR) code that encodes a deletion code, and the decoded deletion code may have been stored in smart card memory 140. As a further example, mobile device 100 may have been placed in proximity to a deletion code delivery device that transmits, via Near Field Communication (NFC) protocols, a deletion code to mobile device 100 where it is then stored in smart card memory 140. FIG. 7 depicts LPA 135 of mobile device 100 determining 705 if a deletion code is already stored in the smart card 110 of mobile device 100.

Smart card 110, subsequent to a memory lookup in smart card memory 140, replies with an indication that the deletion code is, or is not, already stored in memory 140. If the deletion code is already stored in memory 140 of smart card 110 (YES—block 605), then the exemplary process continues at block 650 below with the deletion of the MNO profile from smart card memory 140. FIG. 7 depicts LPA 135 deleting 710 the current MNO profile from smart card memory 140 if a deletion code is already stored in smart card 110. If a deletion code is not already stored in smart card 110 (NO—block 605), then LPA 135 at mobile device 100 sends a request for a deletion code to subscription mgt node 120 (block 610). In one implementation, the request for the deletion code may include the smart card ID of the smart card 110 of the mobile device 100, and/or the profile ID of the current MNO profile. FIG. 7 depicts LPA 135 at mobile device 100 sending 715 a request for a deletion code to subscription mgt node 120 if a deletion code is not already stored in smart card memory 140 of smart card 110. Upon receipt of the request for the deletion code, subscription mgt node 120 may generate and issue the deletion code, as described in further detail below with respect to the exemplary process of FIG. 8.

LPA 135 at mobile device 100, in response to the request for a deletion code, receives a deletion code issued from subscription mgt node 120 (block 615). The deletion code generated by subscription mgt node 120 may include multiple components as described above with respect to the deletion code 500 of FIG. 5. In the example depicted in FIG. 7, the deletion code 720 generated by subscription mgt node 120 may include the smart card ID (e.g., the EID), the profile ID (e.g., the ICCID), the public key of subscription mgt node 120, the CA-signed public key of subscription mgt node 120, and the deletion code signature, all concatenated together as a single string of data.

LPA 135 at mobile device 100 extracts the smart card ID, the profile ID, the public key, the CA-signed public key, and the deletion code signature from the received deletion code (block 620). Referring to the exemplary deletion code 500 of FIG. 5, upon receipt of the data string represented by deletion code 500, LPA 135 extracts the smart card ID data 510, the profile ID data 520, the subscription mgt node public key data 530, the CA-signed public key data 540, and the deletion code signature data 560 from deletion code 500. FIG. 7 depicts LPA 135 of mobile device 100 extracting 725 the EID, the ICCID, the public key, the CA-signed public key, and the deletion code signature from the deletion code 720 received from subscription mgt node 120.

LPA 135 validates the public key of subscription mgt node 120 extracted from the received deletion code (block 625). Validation of the public key of subscription mgt node 120 may include LPA 135 comparing the public key against a Certificate Revocation List (CRL), the contents of which are maintained current by, for example, certificate authority 210 of the PKI system. Whenever CA 210 revokes a particular certificate, the corresponding public key is placed in the CRL for future lookup. In one implementation, LPA 135 sends a message to CA 210, containing the public key of subscription mgt node 120, and CA 210 returns a message, after performing a lookup into the CRL, that indicates whether the public key has been revoked. If the public key of subscription mgt node 120 is found in the CRL, the public key is determined by LPA 135 to not be successfully validated. If the public key is not found in the CRL, then the public key is determined by LPA 135 to be successfully validated.

LPA 135 validates the deletion code signature extracted from the received deletion code (block 630). Validation of the deletion code signature may include using a signature verifying algorithm that is the counterpart to the signature generation algorithm used by subscription mgt node 120 to generate the deletion code signature based on subscription mgt node 120's private key. The signature verifying algorithm uses the public key to derive the original block of data that was signed with the signature generation algorithm using the private key of the public/private key pair. LPA 135 uses the subscription mgt node 120's public key, extracted from data 530 of deletion code 500, and applies the signature verifying algorithm to the deletion code signature 560 extracted from deletion code 500. LPA 135 takes the block of data that results from application of the signature verifying algorithm, breaks the block of data into its original smart card ID, profile ID, public key, and CA-signed public key components, and compares each of those components with the appropriate data (e.g., 510, 520, 530, and 540) of the received deletion code 500. If a component-by-component comparison of the data indicates that each component of the block of data matches a corresponding component of the received deletion code 500, then LPA 135 considers the deletion code signature to be validated. FIG. 7 depicts LPA 135 validating 730 the received public key, and then validating 735 the deletion code signature.

LPA 135 validates the smart card ID and the profile ID extracted from the received deletion code (FIG. 6B; block 635). Validation of the smart card ID and the profile ID may include, for example, comparing the smart card ID extracted from the deletion code with the smart card ID stored in smart card memory 140 of mobile device 100 to determine if they match, and comparing the profile ID extracted from the deletion code with the profile ID stored in smart card memory 140 of mobile device to determine if they match. The validation of the smart card ID and the profile ID is considered successful if the smart card ID and the profile ID extracted from the deletion code match those stored in smart card memory 140 of smart card 110. FIG. 7 depicts LPA 135 validating 740 the smart card ID (e.g., the EID) and the profile ID (e.g., the ICCID).

LPA 135 determines if the deletion code components have been successfully validated (block 640). If the deletion code components have each been successfully validated in blocks 625, 630, and 635 of FIGS. 6A and 6B, then the received deletion code is considered to be successfully validated. If the deletion code components (blocks 625, 630 and 635) have not been successfully validated (NO—block 640), then the LPA 135 does not cause the MNO profile to be deleted from memory 140 at mobile device 100 (block 645). If the deletion code components (blocks 625, 630, and 635) have been successfully validated (YES—block 645), then the LPA 135 causes the MNO profile to be deleted from smart card memory 140 (block 650). LPA 135 sends an instruction to smart card 110 to delete the MNO profile, and processing unit 410 of smart card 110 deletes the MNO profile from smart card memory 140. FIG. 7 depicts LPA 135 of mobile device 100 causing the MNO profile to be deleted 745 from smart card memory 140 if the validations of blocks 625, 630 and 635 are successful.

LPA 135 provides a confirmation of the MNO profile deletion to customer 115 (block 655). The provided confirmation may include, for example, a visual confirmation (e.g., a notification message upon a display of mobile device 100), an audio confirmation (e.g., a notification sound via a speaker of mobile device 100), and/or an audiovisual confirmation (e.g., both the visual notification message accompanied with the notification sound). FIG. 7 depicts LPA 135 providing a confirmation 750 of deletion of the current MNO profile from smart card memory 140 of mobile device 100. LPA 135 may cause the deletion code to be stored in smart card memory 140 (block 660). The deletion code may be stored in smart card memory 140 for future use in smart card memory operations, such as, for example, deleting one or more subsequent, new or updated MNO profiles from smart card memory 140.

The exemplary process of FIGS. 6A and 6B may be repeated for each customer request to delete a MNO profile, received from customer 115 at mobile device 100.

Figure 8:
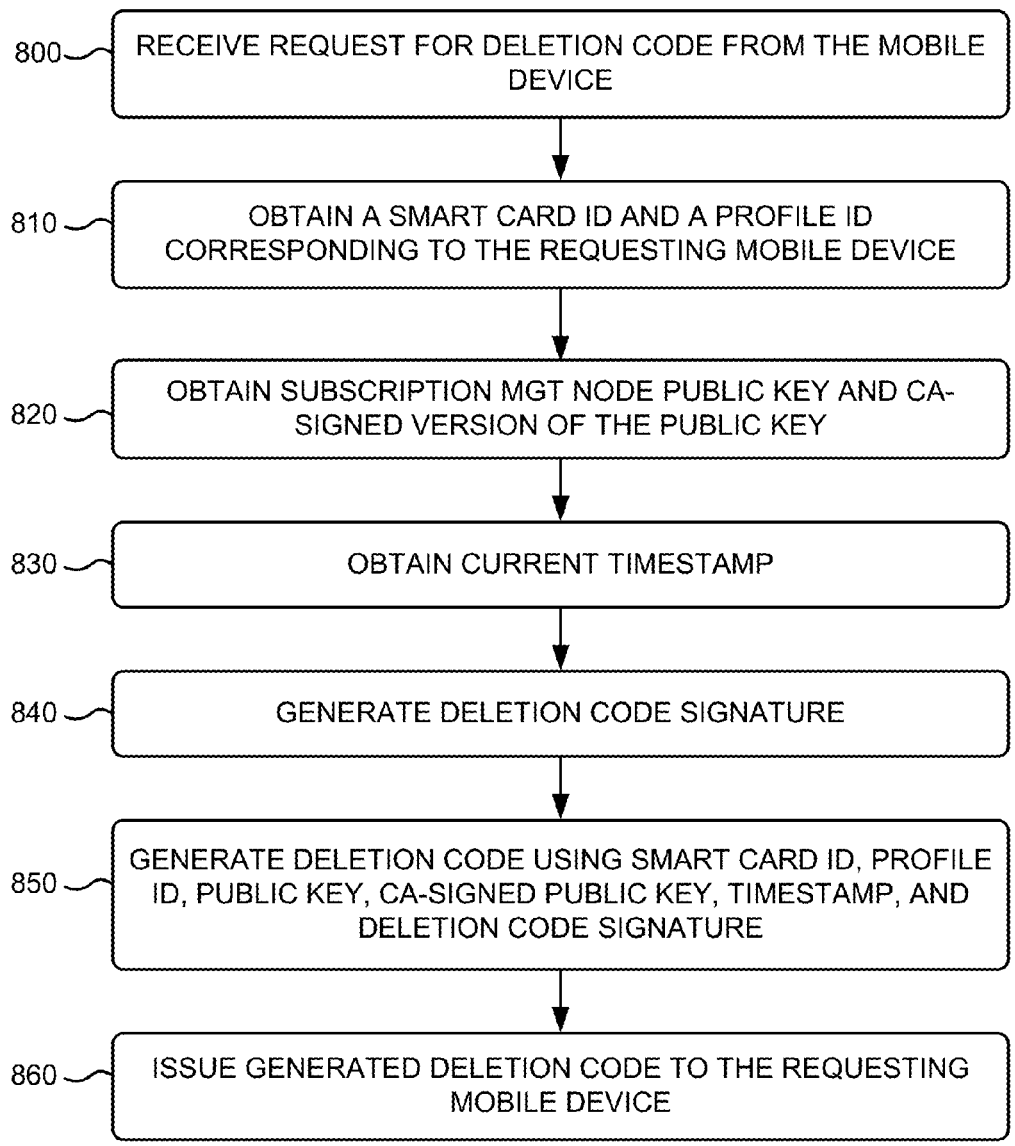
FIG. 8 is a flow diagram illustrating an exemplary process for generating and issuing a profile deletion code.

FIG. 8 is a flow diagram illustrating an exemplary process for generating and issuing a profile deletion code 500. In one implementation, the exemplary process of FIG. 8 may be implemented by subscription mgt node 120. The exemplary process of FIG. 8 is described with reference to the exemplary messaging diagram of FIG. 7.

The exemplary process includes subscription mgt node 120 receiving a request for a deletion code from mobile device 100 (block 800). Referring again to FIG. 7, subscription mgt node 120 may receive a request 715 for a deletion code from LPA 135 at mobile device 100. Subscription mgt node 120 obtains a smart card ID and a profile ID corresponding to the requesting mobile device (block 810). In one implementation, the received request for the deletion code may contain the smart card ID and the profile ID. In other implementations, subscription mgt node 120 may have previously stored the smart card ID and the profile ID for the particular mobile device 100 from which the request for a deletion code has been received. In further implementations, subscription mgt node 120 may obtain the smart card ID and the profile ID from another node within network(s) 230, such as, for example, a subscriber service storage node in a PLMN of network(s) 230.

Subscription mgt node 120 obtains its public key and a certificate authority-signed version of the public key (block 820). Subscription mgt node 120 may have previously obtained an asymmetric encryption key pair, including a public key and a corresponding private key, from another node in network(s) 230. Alternatively, subscription mgt node 120 may implement, itself, an encryption key generation algorithm that generates the public and private key pair. Subscription mgt node 120 may also engage in PKI processes to provide the public key to the PKI system, and to obtain a digital certificate that maps the public key to the particular customer/user of mobile device 100. The Certificate Authority of the PKI system, upon successful registration and authentication of the identity of the customer/user, digitally signs the public key (e.g., using the CA's own private key) and returns to the CA-signed public key to subscription mgt node 120.

Subscription mgt node 120 obtains a current timestamp (block 830). Subscription mgt node 120 may maintain an accurate clock that keeps track of the current date and/or time. The time may, for example, include a Universal Time Coordinated (UTC) time that subscription mgt node 120 may synchronize with an external time standard. Subscription mgt node 120 generates a deletion code signature (block 840). Subscription mgt node 120 may concatenate the smart card ID, the profile ID, the subscription mgt node 120's public key, and the CA-signed public key together to create a string of data. Subscription mgt node 120 may then generate a deletion code signature, using a signature generation algorithm and the private key of subscription mgt node 120, applying the signature generation algorithm to the string of data including the smart card ID, the profile ID, the subscription mgt node 120's public key, and the CA-signed public key. Subscription mgt node 120 may use various different existing signature generating algorithms to generate the signature. Such signature generating algorithms may include, for example, RSA-based signature schemes, the Digital Signature Algorithm (DSA), the Pointcheval-Stern Signature algorithm, or the Rabin Signature algorithm.

Subscription mgt node 120 generates a deletion code using the smart card ID, the profile ID, the public key, the CA-signed public key, the timestamp, and the deletion code signature (block 850). Subscription mgt node 120 may optionally concatenate the timestamp (i.e., obtained in block 830) to the string of data that includes data 510, 520, 530 and 540 of FIG. 5. Subscription mgt node 120 appends the generated deletion code signature (of block 840) to produce the profile deletion code. Referring to FIG. 5, the deletion code 500 may include data that further includes the smart card ID 510, the profile ID 520, the subscription mgt node public key 530, the CA-signed public key 540, an optional timestamp 550, and the deletion code signature 560. Subscription mgt node 120 issues the generated deletion code to the requesting mobile device 100 (block 860). Referring to FIG. 7, subscription mgt node 120 returns the requested deletion code 720 to LPA 135 at mobile device 100. The generated deletion code 500 of block 850 does not contain any secret values, so it does not need to be protected for confidentiality. The generated deletion code 500 is also unique for each subscription mgt node 120, and is directed to a specific smart card ID and profile ID such that the deletion code 500 cannot be replayed to another smart card (e.g., another eUICC). The timestamp 560 may also be used to ensure that deletion code 500 cannot improperly used at a future time to conduct a replay attack.

The exemplary process of FIG. 8 may be repeated for each request for a deletion code received at subscription mgt node 120 from a mobile device 100.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 6A, 6B, and 8, and message flows with respect to FIG. 1 or 7, the order of the blocks and/or message flows may be varied in other implementations. Additionally, though provision and validation of the deletion code has been described herein for purposes of deleting an MNO profile from smart card memory 140, the deletion code may also be used for other LPA commands and/or smart card memory operations. For example, the provision and successful validation of the deletion code may control the enabling, disabling, and/or downloading of MNO profiles in smart card memory 140 (e.g., LPA enable, disable, and/or download commands). As another example, the provision and successful validation of the deletion code may control a smart card memory reset, such as an eUICC memory reset LPA command.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and the type of information. Storage and use of personal information may be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, via a user interface of a mobile device, a customer request to delete a Mobile Network Operator (MNO) profile from a smart card within the mobile device, wherein the MNO profile comprises one or more network access credentials for accessing a wireless mobile network;
sending, from the mobile device to a network node in the wireless mobile network, a request for profile deletion;
receiving, responsive to the request from the network node, a deletion code;
extracting, from the received deletion code:
a deletion code signature,
a public key of the network node,
a smart card identifier (ID), and
a profile ID;
validating the deletion code signature and the public key;
validating the smart card ID and the profile ID; and
deleting the MNO profile from the smart card upon successful validation of:
the deletion code signature,
the public key,
the smart card ID, and
the profile ID.

2. The method of claim 1,
wherein the profile ID comprises an Integrated Circuit Card ID (ICCID) associated with the MNO profile.

3. The method of claim 2, wherein the smart card ID comprises an embedded Universal Integrated Circuit Card (eUICC) ID associated with the smart card.

4. The method of claim 1, wherein the deletion code comprises a string of data that further comprises multiple concatenated data components.

5. The method of claim 4, wherein the deletion code signature comprises a signature generated by applying a signature algorithm to two or more of the multiple concatenated data components of the deletion code.

6. The method of claim 1, wherein, if the deletion code signature and the public key are not successfully validated, continuing to store the MNO profile in the smart card.

7. The method of claim 1, further comprising:
providing, upon deletion of the MNO profile from the smart card, a confirmation of the deletion to a customer of the mobile device.

8. A device, comprising:
a microprocessor smart card configured to store a Mobile Network Operator (MNO) profile for the device, wherein the MNO profile comprises one or more network access credentials for accessing a wireless mobile network;
a communication interface configured to connect to the wireless mobile network;
a processing unit, or logic, coupled to the microprocessor smart card and the communication interface, and configured to:
receive a customer request to delete the MNO profile from the microprocessor smart card,
send, via the communication interface and the wireless mobile network, a request for profile deletion to a network node external to the device;
receive, via the communication interface and responsive to the request, a deletion code from the network node,
extract, from the received deletion code:
a deletion code signature,
a public key of the network node,
a smart card identifier (ID), and
a profile ID;
validate the deletion code signature and the public key,
validate the smart card ID and the profile ID; and
delete the MNO profile from the smart card upon successful validation of:
the deletion code signature,
the public key,
the smart card ID, and
the profile ID.

9. The device of claim 8, wherein the microprocessor smart card comprises one of a Universal Integrated Circuit Card (UICC), a removable user identity module (R-UIM) card, or a subscriber identity module (SIM).

10. The device of claim 8, wherein the processing unit, or the logic, is further configured to:
wherein the profile ID comprises an Integrated Circuit Card ID (ICCID) associated with the MNO profile.

11. The device of claim 10, wherein the smart card ID comprises an embedded Universal Integrated Circuit Card (eUICC) ID associated with the smart card.

12. The device of claim 8, wherein the deletion code comprises a string of data that further comprises multiple concatenated data components.

13. The device of claim 12, wherein the deletion code signature comprises a signature generated by applying a signature algorithm to two or more of the multiple concatenated data components of the deletion code.

14. The device of claim 8, wherein, if the deletion code signature and the public key are not successfully validated, the microprocessor smart card does not delete, and continues to store, the MNO profile.

15. The device of claim 8, wherein the processing unit, or the logic, is further configured to:
cause a confirmation of the deletion of the MNO profile to be provided to a customer associated with the device upon deletion of the MNO profile from the microprocessor smart card.

16. A non-transitory storage medium storing instructions executable by a processing unit associated with a mobile device, wherein the instructions comprise instructions to cause the processing unit to:
receive a customer request to delete a Mobile Network Operator (MNO) profile from a smart card within a mobile device, wherein the MNO profile comprises one or more network access credentials for accessing a wireless mobile network;
send, from the mobile device to a network node in the wireless mobile network, a request for profile deletion;
receive, responsive to the request from the network node, a deletion code;
extract, from the received deletion code:
a deletion code signature,
a public key of the network node,
a smart card identifier (ID), and
a profile ID;
validate the deletion code signature and the public key;
validate the smart card ID and the profile ID; and delete the MNO profile from the smart card upon successful validation of:
the deletion code signature,
the public key,
the smart card ID, and
the profile ID.

17. The non-transitory storage medium of claim 16, wherein the smart card ID comprises an embedded Universal Integrated Circuit Card (eUICC) ID associated with the smart card, and the profile ID comprises an Integrated Circuit Card ID (ICCID) associated with the MNO profile.

18. The non-transitory storage medium of claim 16, wherein the deletion code comprises a string of data that further comprises multiple concatenated data components.

19. The non-transitory storage medium of claim 18, wherein the deletion code signature comprises a signature generated by applying a signature algorithm to two or more of the multiple concatenated data components of the deletion code.

20. The non-transitory storage medium of claim 16, wherein the instructions comprise instructions to cause the processing unit to:
cause a confirmation of the deletion of the MNO profile to be provided to a customer associated with the mobile device upon deletion of the MNO profile from the smart card.

* * * * *